(12) United States Patent
Cohen et al.

(10) Patent No.: US 6,898,898 B1
(45) Date of Patent: May 31, 2005

(54) SECTIONED ARTICLE FOR MOSQUITO CONTROL AND PACKAGE THEREOF

(75) Inventors: Jonathan S. Cohen, Owings Mills, MD (US); Russell J. Ashton, Baltimore, MD (US); Samuel A. Ashton, Baltimore, MD (US)

(73) Assignee: Summit Chemical Company, Baltimore, MD (US)

( * ) Notice: Subject to any disclaimer, the term of this patent is extended or adjusted under 35 U.S.C. 154(b) by 0 days.

(21) Appl. No.: 10/641,708

(22) Filed: Aug. 15, 2003

(51) Int. Cl.⁷ .............................................. A01M 1/20
(52) U.S. Cl. ....................................... 43/132.1; 43/124
(58) Field of Search ........................ 43/124, 131, 132.1; 220/23.4; 221/2

(56) References Cited

U.S. PATENT DOCUMENTS

| | | | |
|---|---|---|---|
| 4,631,857 A | 12/1986 | Kase et al. ................. | 43/132.1 |
| 4,804,142 A * | 2/1989 | Riley ........................... | 239/56 |
| 5,239,772 A * | 8/1993 | Burian et al. .................. | 43/131 |
| 5,904,263 A | 5/1999 | St. Pierre et al. .......... | 220/23.4 |
| 6,219,961 B1 * | 4/2001 | Ballard et al. ................ | 43/131 |
| 6,474,015 B1 * | 11/2002 | Lund et al. .................... | 43/124 |
| 6,675,527 B1 * | 1/2004 | Barere .......................... | 43/114 |
| 2003/0041505 A1 * | 3/2003 | Flinn et al. ................ | 43/132.1 |

* cited by examiner

*Primary Examiner*—Kurt Rowan
(74) *Attorney, Agent, or Firm*—Armstrong, Kratz, Quintos, Hanson & Brooks, LLP

(57) ABSTRACT

A package for mosquito control articles having a plurality of wells within a tray. At least one of the wells has a center post with spokes radiating from the post and forming segments within the at least one well. The mosquito control article is formed in sections with one section in each segment of the at least one well. The number of sections used to treat a body of water is determined by the surface area of the body of water and the predetermined amount of active ingredient in each section of the mosquito control article. A method of use is disclosed.

12 Claims, 2 Drawing Sheets

SECTIONED ARTICLE FOR MOSQUITO CONTROL AND PACKAGE THEREOF

BACKGROUND OF THE INVENTION

1. Field of the Invention

The present invention relates to an article to control mosquito larvae in water and more particularly to an article having sections which are used with a predetermined area of water.

2. Description of Related Art

The use of floating "doughnuts" containing a mosquito larvacide is disclosed in U.S. Pat. No. 4,631,857 to Kase et al. In this patent, the "doughnut" is used in large ponds and small bodies of water. There has been no effort to have an article which contains an amount of active ingredient which may be used for a smaller or larger body of water. This is wasteful when the article is used for small bodies of water such as a catch basin.

U.S. Pat. No. 5,904,263 to St. Pierre et al disclose a multi-container package with individually removable containers. The package has separate, individually sealed containers. There is no center post with spokes forming sub-compartments. Also, the package is used with food.

Thus, even though the Kase et al patent has been known for over sixteen (16) years, no one has improved on the device to make available an article which contains sufficient active mosquito larvacide for larger or smaller bodies of water and from which the proper amount can be selected.

BRIEF SUMMARY OF THE INVENTION

It is an object of the present invention to provide a method of controlling mosquitos by placing a section of an article containing a predetermined amount of mosquito larvacide in the body of water wherein the size of the section is related to the surface area of the body of water.

It is a further object of the present invention to have a package from which selected size segments of the article may be selected.

In accordance with the teachings of the present invention, there is disclosed a method for providing mosquito control articles which may be adapted to a surface area of a body of water to be protected against mosquito larvae. A tray is provided having at least one well formed therein. The at least one well has a post formed centrally therein. In the at least one well, a plurality of spokes are connected to the post and radiate outwardly therefrom, forming segments within the at least one well. A portion of the mosquito control article is disposed in each segment in the at least one well. A predetermined amount of mosquito larvacide is contained in each portion of the article. Said predetermined amount is effective for a corresponding predetermined surface area of the body of water. In this manner, multiple sections of the article may be removed from the at least one well and placed in the water, depending on the total surface area of the body of water to be protected.

Additionally, in accordance with the teachings of the present invention, there is disclosed a package containing at least one mosquito control article for use in a body of water. The package has a tray having at least one well formed therein. The at least one well has circumferential walls, a center post and a plurality of spokes formed between the center post and the circumferential well, thereby defining a plurality of segments within the well. The at least one mosquito control article has a plurality of sections, each of the plurality of sections being disposed in a corresponding segment within the well. Each section of the article contains a predetermined amount of mosquito larvacide. Said predetermined amount of mosquito larvacide is effective for a predetermined surface area of water. In this manner, the total surface area of the body of water determines the number of sections of the article which are required for effective mosquito control.

Further in accordance with the teachings of the present invention, there is disclosed an improvement to a package containing a mosquito control article, the mosquito control article being floatable on a body of water. A tray has a well therein; the well having a center post and spokes radiating from the center post and forming segments within the well. The mosquito control article has a plurality of sections, one section being disposed in each respective segment in the well. Each section has a predetermined amount of active mosquito larvacide therein. The predetermined amount of larvacide is capable of treating a predetermined surface area of water. In this manner, the number of sections of the article placed in the body of water is a function of the surface area of the body of water.

In still further accordance with the teachings of the present invention, there is disclosed a package containing articles for control of mosquitos. A tray has a plurality of wells formed therein. The articles for control of mosquito are disposed in the wells, one article in each well. Each article is floatable in water. Each article contains a predetermined amount of *Bacillus Thuringiensis israelensis*. Said predetermined amount is effective for treating a predetermined surface area of a body of water. At least one article is formed into sections. A removable cover is disposed over the tray covering the wells. The removable cover may be removed separately from each well and one or more of the articles, or a section of one of the articles, may be removed from the respective well and placed in the body of water. The total surface area of the body of water determines how much of the article is placed in the body of water.

These and other objects of the present invention will become apparent from a reading of the following specification taken in conjunction with the enclosed drawings.

DESCRIPTION OF PREFERRED EMBODIMENTS

Figure 1:
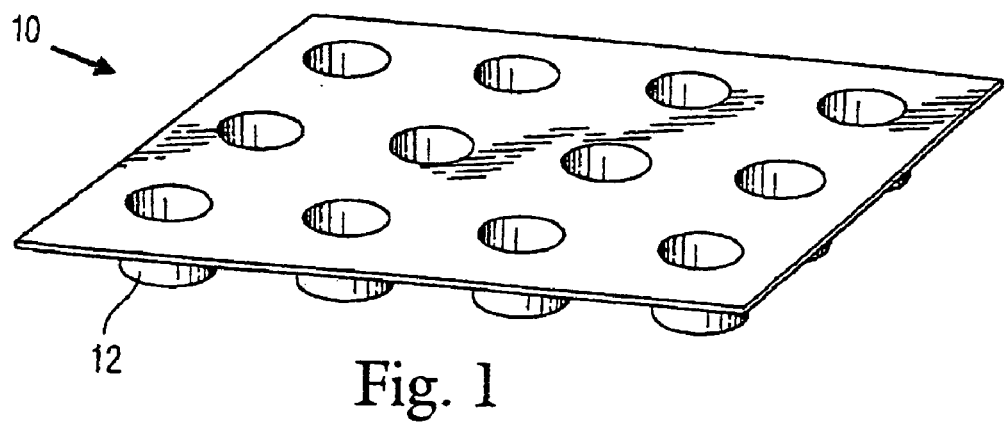
FIG. 1 is a perspective view of the package of the present invention.
Figure 2:
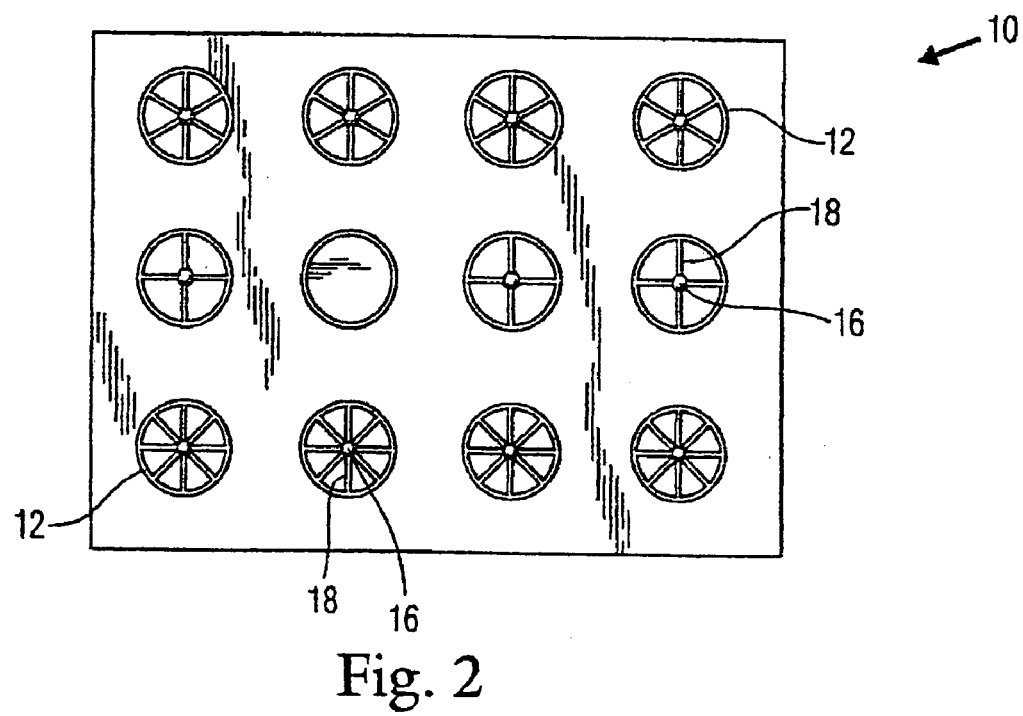
FIG. 2 is a top plan view of the package.
Figure 3:
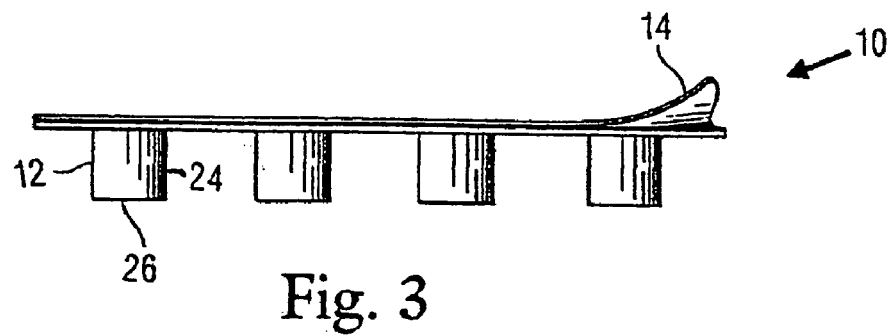
FIG. 3 is a side elevation view of the package with the cover over the articles within the wells.
Figure 4:
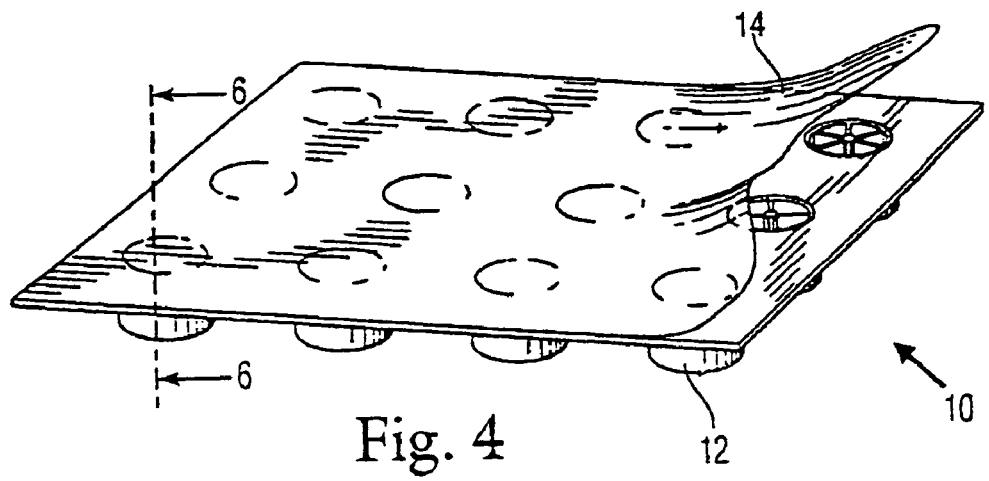
FIG. 4 is a perspective view of a segmented article in a wall in the package with the protective cover peeled back.
Figure 5:
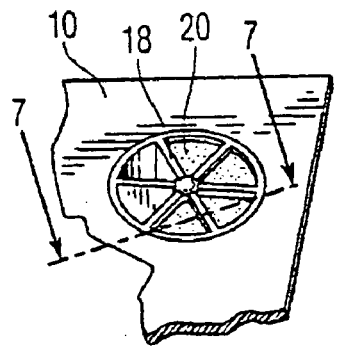
FIG. 5 is an enlarged view of FIG. 4.
Figure 6:
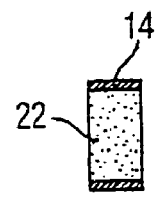
FIG. 6 is a cross-sectional view taken across the lines 6—6 of FIG. 4.
Figure 8:
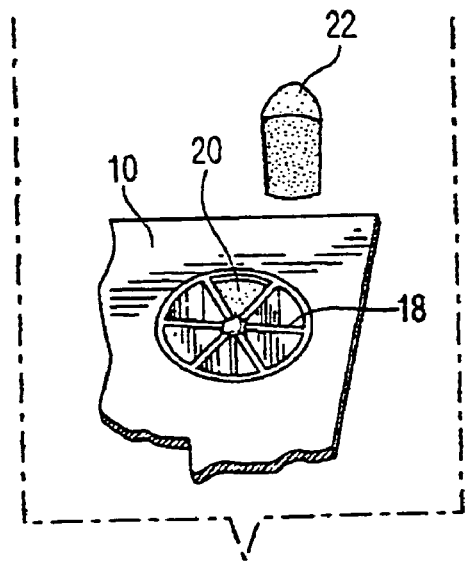
FIG. 8 is a view showing one segment of the article removed from the well.
Figure 7:
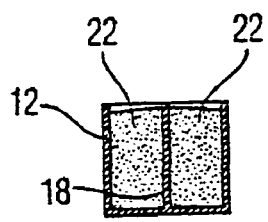
FIG. 7 is a cross-sectional view taken across the lines 7—7 of FIG. 6.

Referring now to FIGS. 1–3, a tray 10 having a plurality of spaced-apart wells 12 formed therein preferably is formed from plastic or disposable material. Each well is covered by a cover 14. Preferably, the cover 14 is a peelable sheet which is lightly attached to the top of the tray 10 such that each well 12 is covered and the cover 14 may be selectively removed from an individual well. The cover 14 may be an individual cap for the well which may have a threaded closure or may be a friction fit (snap-on).

It is preferred that at least one well 12 and preferably most of the wells 12 have a center post 16 and a plurality of spokes 18 which radiate outwardly from the center post 16 to the circumferential wall 24 of the well 12. The spokes 18 preferably have a height equal to the depth of the well 12 from the bottom 26 of the well 12 to the open top which has a cover thereon. The spokes 18 define a plurality of segments within the well 12. The number of spokes 18 may be different between wells 12 in the tray 10.

A mosquito control article 20 is disposed in each well 12. The mosquito control article preferable is the type disclosed in U.S. Pat. No. 4,631,857, which is incorporated herein by reference. The mosquito control article 20 floats on water and has an active ingredient of *Bacillus Thuringiensis israelensis*. The mosquito control article is used by placing it in a body of water. A sustained release of the active ingredient kills the mosquito larvae in the body of water. The amount of active ingredient is predetermined to treat a predetermined surface area of a body of water. The entire content of the article 20 from a single well 12 is effective for a body of water having a surface area of 100 sq. ft. For smaller bodies of water, a lesser quantity of the mosquito control article 20 may be used. For example, for a container having a surface area of 12.5 sq ft., one-eighth (⅛) of a section of the article 20 may be used. The article 20 is divided into sections 22 and disposed in the segments within the well 12 as determined by the number of spokes 18.

Thus, it is possible to select the number of sections 22 of the article 20 to provide an effective larvacide for a given surface area of a body of water. In this manner, the surface area of the body of water determines the number of sections 22 of the article 20 to be used economically and effectively.

Thus, in use, a well 12 which has a mosquito control article 20 having the desired number of sections 22 is uncovered and the desired number of sections are removed from the well and placed in the body of water. If necessary for large bodies of water, the article 20 from more than one well 12 may be placed in the water.

For example:

1. The body of water has a surface area of 500 sq. ft. A total of five (5) articles should be placed in the body of water.

2. The body of water has a surface area of 75 sq. ft. If the article has eight (8) sections, a total of six (6) sections should be placed in the water. If the article has four (4) sections, a total of three (3) sections should be placed in the water.

3. The body of water has a surface area of approximately 12.5 sq. ft. If the article has eight (8) sections, only one (1) section should be placed in the water.

The balance of the package is retained with the wells 12 covered until ready for use.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. A package containing a plurality of articles for the control of mosquitos in a body of water, comprising:

a tray having a plurality of spaced-apart wells formed therein, each well having an open top and circumferential walls connected to a bottom of the well, at least one well of said wells having a center post formed therein, said center post terminating at the bottom of the well, with a plurality of spokes being connected between the center post and the circumferential wall, the spokes radiating outwardly from the center post forming segments within the at least one well, each article of said plurality of articles for control of mosquitos having at least one removable section, the at least one removable section having a predetermined quantity of an active ingredient for control of mosquitos contained therein, each article of said plurality of articles for control of mosquitos being received in a separate well, the removable sections of the article being disposed into the respective segments within the at least one well, the removable sections conforming to the respective segments, wherein each at least one section of the article is individually removable from the open top of the respective well such that the entire article, or one or more sections thereof, may be removed from the open top of the respective well as desired and as needed to treat the body of water.

2. The package of claim 1, wherein the at least one well has a depth between the bottom and the open top, each spoke having a height corresponding to the depth of the at least one well.

3. The package of claim 1, wherein each well has a selected number of spokes formed therein, wherein the number of spokes may vary from well to well, thereby receiving articles with corresponding varying numbers of sections providing a means to treat bodies of water of varying volumes.

4. The package of claim 1, further comprising a removable cover disposed over the wells.

5. In combination with a plurality of articles intended to be tossed into ponds and other bodies of water and to float and disintegrate thereon for mosquito control purposes, a package for the manufacture, shipment and convenient dispensing of the articles, the articles being sequentially selected by the user thereof, comprising a tray having a plurality of wells depending therefrom to receive the respective plurality of articles, a removable protective cover for tray, thereby retaining the articles in the respective wells until being selected and removed by the user, and at least one of the wells having a center post terminating at a bottom of the at least one well, at least one spoke radiating outwardly from the center post for forming a plurality of smaller portions of the respective articles in the said at least one well, so that where a smaller pond or body of water is encountered, only a smaller portion of the respective article may be employed, thus obtaining an economical benefit for the user.

6. The combination of claim 5, wherein the articles comprise generally-cylindrical discs, and wherein the depending wells on the tray are generally cylindrical and complementary to the discs.

7. The combination of claim 6, wherein the smaller portions of the said at least respective disc comprise a plurality of circumferential segments.

8. The combination of claim 7, wherein each well has a cylindrical wall, and wherein the circumferential segments are formed by a plurality of planar spokes radiating from the central post to the cylindrical wall of the respective one well.

9. The combination of claim 5, wherein the removable protective cover comprises a peel-off cover.

10. The combination of claim 5, wherein the tray comprises a planar tray.

11. The combination of claim 5, wherein the articles comprise a larvicidal micro-organism.

12. The combination of claim 11, wherein the micro-organism comprises *Bacillus Thuringiensis Israelensis*.

* * * * *